(12) United States Patent
Wesselky et al.

(10) Patent No.: US 9,370,792 B2
(45) Date of Patent: Jun. 21, 2016

(54) PRODUCTION METHOD FOR A PAINT PLANT COMPONENT AND CORRESPONDING PAINT PLANT COMPONENT

(75) Inventors: Steffen Wesselky, Adelberg (DE);
Hans-Georg Fritz, Ostfildern (DE);
Frank Herre, Oberriexingen (DE);
Timo Beyl, Besigheim (DE)

(73) Assignee: Duerr Systems GmbH, Bietigheim-Bissingen (DE)

( * ) Notice: Subject to any disclaimer, the term of this patent is extended or adjusted under 35 U.S.C. 154(b) by 1361 days.

(21) Appl. No.: 13/119,064

(22) PCT Filed: Sep. 15, 2009

(86) PCT No.: PCT/EP2009/006674
§ 371 (c)(1),
(2), (4) Date: May 23, 2011

(87) PCT Pub. No.: WO2010/028864
PCT Pub. Date: Mar. 18, 2010

(65) Prior Publication Data
US 2011/0221100 A1    Sep. 15, 2011

(30) Foreign Application Priority Data

Sep. 15, 2008    (DE) .......................... 10 2008 047 118

(51) Int. Cl.
*B29C 67/00* (2006.01)
*B22F 3/105* (2006.01)
(Continued)

(52) U.S. Cl.
CPC ............... *B05B 15/02* (2013.01); *B05B 3/1092* (2013.01); *B29C 67/0085* (2013.01); *B05B 12/149* (2013.01); *B29K 2995/0073* (2013.01)

(58) Field of Classification Search
CPC ............ B29C 67/0088; B29C 67/0077; B29C 67/0085; B22F 3/105; B22F 3/1055; B22F 3/11; B29K 2995/0073; B05B 15/02; B05B 3/1092
USPC ..................................................... 219/121.85
See application file for complete search history.

(56) References Cited

U.S. PATENT DOCUMENTS 5,002,854 A * 3/1991 Fan et al. ................... 425/174.4
5,208,431 A * 5/1993 Uchiyama .......... B23K 26/0853
156/272.8

(Continued)

FOREIGN PATENT DOCUMENTS

DE    2092378 U    4/1991
DE    10233198 A1    2/2004
(Continued)

OTHER PUBLICATIONS

Dean, "Fluid motion in a curved channel", Dec. 1928, Royal Society A, vol. 121, pp. 402-420.*
(Continued)

*Primary Examiner* — Geoffrey S Evans
(74) *Attorney, Agent, or Firm* — Bejin Bieneman PLC

(57) ABSTRACT

Exemplary production methods for producing a paint plant component, e.g., for producing a component of a color changer, a color valve, or a spray device, are disclosed. According to the exemplary illustrations, the paint plant component may be produced in a rapid prototyping method. The exemplary illustrations also include a paint plant component that is produced accordingly.

20 Claims, 8 Drawing Sheets

(51) Int. Cl.
*B05B 15/02* (2006.01)
*B05B 3/10* (2006.01)
*B05B 12/14* (2006.01)

(56) References Cited

U.S. PATENT DOCUMENTS

| | | | |
|---|---|---|---|
| 5,286,573 A * | 2/1994 | Prinz | B22F 3/115 264/255 |
| 5,386,955 A * | 2/1995 | Savill | 138/38 |
| 5,626,758 A * | 5/1997 | Belfort | 210/636 |
| 5,957,052 A * | 9/1999 | Endisch et al. | 101/375 |
| 6,158,346 A | 12/2000 | Zhang | |
| 6,401,001 B1 * | 6/2002 | Jang et al. | 700/118 |
| 6,406,658 B1 * | 6/2002 | Manners et al. | 264/401 |
| 6,602,545 B1 | 8/2003 | Shaikh et al. | |
| 6,652,256 B2 | 11/2003 | Coe | |
| 6,936,212 B1 * | 8/2005 | Crawford | B28B 1/00 264/308 |
| 7,020,539 B1 * | 3/2006 | Kovacevic | B22F 3/1055 483/16 |
| 7,754,135 B2 * | 7/2010 | Abe et al. | 264/408 |
| 8,178,033 B2 * | 5/2012 | Dietrich et al. | 264/497 |
| 2001/0043990 A1 * | 11/2001 | Chong | B05D 7/02 427/320 |
| 2002/0090313 A1 | 7/2002 | Wang et al. | |
| 2002/0147521 A1 * | 10/2002 | Mok et al. | 700/119 |
| 2003/0151167 A1 * | 8/2003 | Kritchman et al. | 264/401 |
| 2003/0185697 A1 * | 10/2003 | Abe | B22F 3/1055 419/6 |
| 2004/0089983 A1 * | 5/2004 | Jamalabad et al. | 264/497 |
| 2004/0173946 A1 | 9/2004 | Pfeifer et al. | |
| 2004/0187714 A1 * | 9/2004 | Napadensky et al. | 101/35 |
| 2005/0058573 A1 * | 3/2005 | Frost, III | 422/62 |
| 2005/0110177 A1 * | 5/2005 | Schulman | B29C 67/0081 264/16 |
| 2005/0288813 A1 * | 12/2005 | Yang et al. | 700/119 |
| 2006/0127070 A1 * | 6/2006 | Chung et al. | 392/481 |
| 2006/0208102 A1 | 9/2006 | Nolte et al. | |
| 2007/0001342 A1 * | 1/2007 | Oberhofer | B29C 67/0077 264/237 |
| 2007/0007693 A1 * | 1/2007 | Aylward | 264/317 |
| 2007/0007699 A1 * | 1/2007 | Rynerson | B22F 3/008 264/497 |
| 2007/0051704 A1 * | 3/2007 | Husmann et al. | 219/121.6 |
| 2007/0183918 A1 | 8/2007 | Monsheimer et al. | |
| 2008/0129203 A1 * | 6/2008 | Agustsson et al. | 315/5 |
| 2008/0169585 A1 * | 7/2008 | Zinniel | B29C 67/0092 264/401 |
| 2008/0172121 A1 * | 7/2008 | Scholz et al. | 623/1.13 |
| 2008/0201008 A1 * | 8/2008 | Twelves | B23P 21/004 700/160 |
| 2008/0251243 A1 * | 10/2008 | Dimter | B22C 9/061 165/170 |
| 2009/0014907 A1 * | 1/2009 | Kuo | 264/220 |
| 2009/0121393 A1 * | 5/2009 | Abe | B22F 3/1055 264/497 |
| 2009/0292349 A1 * | 11/2009 | Golesworthy | 623/1.15 |
| 2010/0012025 A1 | 1/2010 | Herre et al. | |
| 2010/0143599 A1 | 6/2010 | Herre et al. | |
| 2010/0173167 A1 * | 7/2010 | Vissing et al. | 428/447 |
| 2011/0192432 A1 * | 8/2011 | Lehmann et al. | 134/198 |

FOREIGN PATENT DOCUMENTS

| | | | | |
|---|---|---|---|---|
| DE | 10310385 A1 | 9/2004 | | |
| DE | 102004012682 A1 | 10/2005 | | |
| DE | 102004014209 A1 | 10/2005 | | |
| DE | 60014714 A1 | 3/2006 | | |
| DE | 102004041633 A1 | 3/2006 | | |
| DE | 60114453 T2 | 7/2006 | | |
| DE | 102005015604 A1 | 10/2006 | | |
| DE | 102007009277 A1 | 11/2007 | | |
| DE | 102006062373 A1 * | 6/2008 | | B22F 3/1055 |
| DE | 4332982 A1 | 8/2008 | | |
| DE | 102006058562 A1 | 8/2008 | | |
| RU | 2186681 C2 | 8/2002 | | |
| WO | WO-2004/073889 A1 | 9/2004 | | |
| WO | WO-2007/058160 A1 * | 5/2007 | | |
| WO | WO-2008-132230 A2 * | 11/2008 | | |

OTHER PUBLICATIONS

Ashley, "From CAD art to rapid metal tools", Mar. 1997, Mechanical Engineering, vol. 119, No. 3, pp. 82-87.*
Duffy et al. "Rapid Prototyping of Microfluidic Systems in Poly(dimethylsiloxane)", Dec. 1998, Analytic Chemistry vol. 70, No. 23, pp. 4974-4984.*
Guaus et al., "Instability of the flow in a curved channel with compliant walls", Proc of Royal Society A, vol. 463, pp. 2201-2222.*
Machine translation of German Pat. No. 102006062373, Aug. 2015.*
Russian Decision to Grant, Appl. No. 2011114805, 20 pages, Dec. 2013.
Stratasys, Inc., "Working Under Pressure", 2 pages, Dec. 2003.
Company script "e-Manufacturing Solutions" of EOS GmbH Jan. 2008.
Dave Thompson: "Working under Pressure" XP002585788, Dec. 2003.
PCT/EP2009/006674 International Search Report Dated Feb. 15, 2011.

* cited by examiner

PRODUCTION METHOD FOR A PAINT PLANT COMPONENT AND CORRESPONDING PAINT PLANT COMPONENT

CROSS-REFERENCES TO RELATED APPLICATIONS

This application is a National Stage application which claims the benefit of International Application No. PCT/EP2009/006674 filed Sep. 15, 2009, which claims priority based on German Application No. 10 2008 047 118.6-44, filed Sep. 15, 2008, both of which are hereby incorporated by reference in their entirety.

BACKGROUND

The present disclosure relates to a production method for producing a painting plant component, e.g., for producing a component of a color changer, a color valve, an atomizer, a robot or the like. The present disclosure also relates to a correspondingly produced painting plant component.

Painting plant components, such as for example components of color changers, color valves or atomizers, which are used in motor vehicle painting plants, are conventionally produced by material-removing production methods (e.g. milling, drilling) or primary forming methods (e.g. casting, extrusion) since these production methods allow the necessary low surface roughness of the painting plant components.

One disadvantage of these known production methods is the limited design freedom in terms of the shaping, since certain component shapes cannot be achieved using the respective production methods. For instance, through-lines for media (e.g. rinsing agent, paint, air) are generally formed by bores which, due to the method of production, can nevertheless have only a straight path so that changes in direction of the through-lines are always associated with a kink at which turbulence can occur.

Furthermore, the customary production methods lead in the painting plant components to undercuts and dead spaces which in turn cause pressure losses and impair the rinsability.

Another disadvantage of the known production methods for painting plant components lies in the fact that the production of a model during the development process is relatively complicated and takes a great deal of time.

In addition, the known production methods for painting plant components require a relatively long manufacturing time, which makes extensive stock storage necessary or delays delivery of the finished painting plant components.

Moreover, considerable tooling costs arise in the context of the known production methods for painting plant components, for example for the casting molds required during the casting process or for milling cutters or drills.

Another disadvantage of the known production methods for painting plant components lies in the fact that the actual manufacture must often be assigned to subcontractors due to the production methods used, which is associated with the risk of industrial espionage.

Furthermore, the production of individual small batches of painting plant components is difficult and usually not profitable with the known production methods, so that individual solutions for customers can rarely be implemented.

The documents DE 10 2005 015 604 A1, DE 10 2006 058 562 A1 and DE 10 2004 014 209 A1 disclose coating plant components in general, such as for example a rotary atomizer, a metering device or a robot.

The documents WO 2004/073 889 A1, DE 10 2007 009 277 A1, DE 10 2004 041 633 A1, DE 10 2004 012 682 A1, DE 601 14 453 T2, DE 600 14 714 T2, DE 103 10 385 B4 and DE 101 31 657 A1, as well as the corporate publication "e-Manufacturing Solutions" by EOS GmbH, 1/2008, disclose rapid prototyping methods, but without any specific reference to coating plant components.

Accordingly, there is a need for an improved production method for producing painting plant components.

Additionally, there is a need for correspondingly improved painting plant components.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

Figure 1:
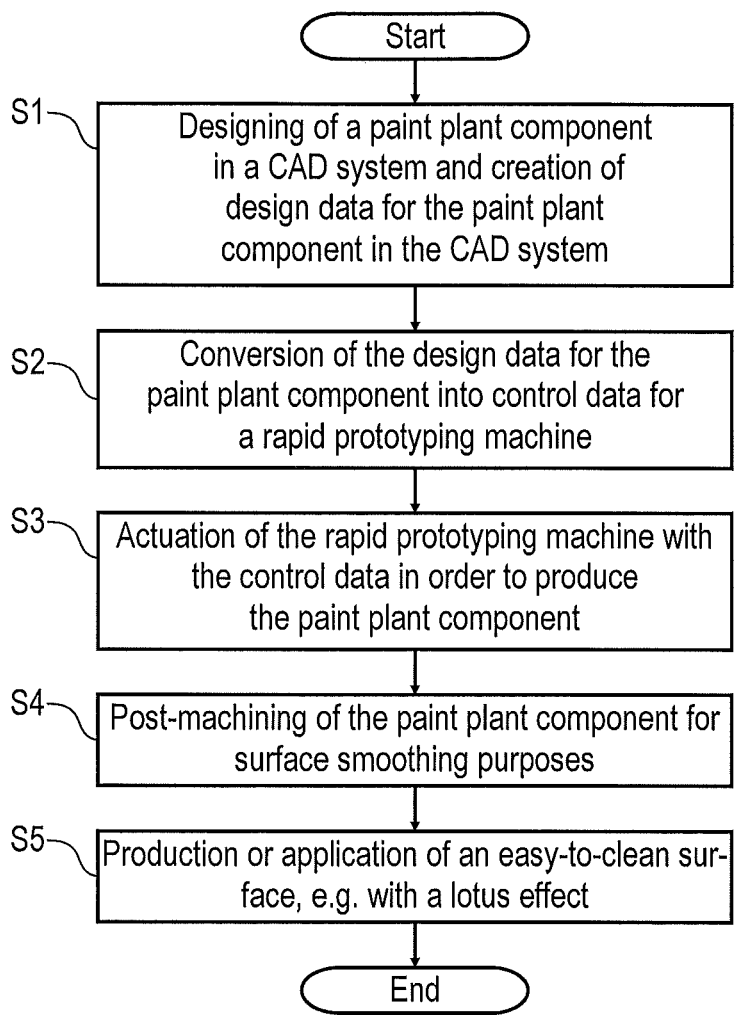
FIG. 1 shows an exemplary production method in the form of a flowchart.

The exemplary illustrations comprise the general technical teaching to produce painting plant components by means of a rapid prototyping method or more generally by means of generative production methods. These are manufacturing methods in which existing CAD data (CAD: Computer Aided Design) are directly and quickly converted into workpieces without any need for manual intervention or molds. In general, these are primary forming methods which build up the painting plant component layer by layer from shapeless or shape-neutral material.

In contrast to the conventional material-removing manufacturing methods (e.g. milling, drilling), therefore, rapid prototyping methods are not production methods which remove material but rather production methods which build up material. In one exemplary illustration, a rapid prototyping method may build up material by forming components progressively in relatively small and discrete layers.

One difference of rapid prototyping methods from the above-mentioned forming methods (e.g. casting) lies in the lack of a predefined mold, so that individual component shapes can be produced.

One example of a rapid prototyping method involves stereolithographic methods (STL or SLA) which are generally carried out with, as materials, liquid duromers or plastics crosslinked to form duromers. In this case, the shape of the painting plant component can be predefined by STL data (STL: Standard Triangulation Language), this being known from the prior art.

Another example of a rapid prototyping method is the so-called selective laser sintering (SLS), which is carried out with thermoplasts (e.g. polycarbonates, polyamides, polyvinyl chloride) but also with metals as the materials.

In the context of the rapid prototyping method, use may also be made of a polyamide casting method which is carried out with polyamide as the material.

So-called powder-based laser generation is also advantageous. In this case, a pulverulent material is continuously introduced by means of feed nozzles into a focused laser beam. The painting plant components are in this case built up layer by layer, the powder being melted by the laser beam and then bonded to the lower powder layer by melt metallurgy. Almost all metal alloys can be used for this.

Furthermore, in the context of the rapid prototyping method, use may also be made of so-called fused deposition modeling, in which the painting plant component is built up layer by layer from meltable plastic. Fused deposition modeling is based on the liquefaction of a wire-shaped material made from plastic or wax by heating. When this material is subsequently cooled, the material solidifies. The application of the material may in this case take place by extrusion, for which purpose use may be made of a heating die that is freely displaceable in the manufacturing plane. During the layer-by-layer production of the model, individual layers are then obtained which bond together to form a part of complex shape.

Another possible rapid prototyping method is the so-called laminated object modeling (LOM), in which a workpiece is built up in layers from paper, experiments also being carried out with films made from ceramic, plastic or aluminum. Each new layer is in this case laminated onto an existing layer and then cut with regard to its contour.

As the rapid prototyping method, use may also be made of so-called 3D printing to produce painting plant components. In this case, a powder (e.g. cellulose powder) is solidified in a targeted manner at individual locations by the injection of a binder.

Another possible production method is so-called contour drafting, which is likewise known per se from the prior art.

Finally, the painting plant components can also be produced by the so-called PolyJet method in the context of the exemplary production methods.

With regard to the rapid prototyping method used, however, the exemplary illustrations are not limited to a specific method but rather can in principle also be carried out using other rapid prototyping methods.

In the prior art, the use of a rapid prototyping method has until now not yet been proposed for producing painting plant components since the known rapid prototyping methods allow only an unsatisfactory surface roughness which is not acceptable for painting plant components since, in the case of media-conveying painting plant components, a lower surface roughness is required in order to achieve good rinsability in the event of a color change or work stoppages. In the context of the exemplary production methods, therefore, the painting plant component produced by the rapid prototyping method may be subjected to a surface-smoothing post-machining after the rapid prototyping method has been carried out, in order to achieve the desired low surface roughness.

By way of example, the surface-smoothing post-machining of the painting plant component may take place by means of an electrochemical treatment, polishing, in particular electropolishing, pickling, grinding, honing, lapping, shot blasting, dry ice blasting, dry snow or finishing. The surface smoothing of the inner wall of through-lines for media (e.g. paint, rinsing agent, air) is particularly important here since paint may adhere to rough inner walls of through-lines and this is disruptive in particular in the event of a color change. Moreover, it should be noted that a pressure loss occurs along the through-lines since preference is given to line cross-sections that are as small as possible. Such through-lines can be smoothed by passing particles through the through-line, wherein the particles may be suspended in a carrier liquid or contained in a carrier gas. As the particles pass through, the particles then act abrasively on the inner wall of the through-line and thus lead to a surface smoothing. By way of example, the particles may be granules, beads, spheres, shaped parts or dust made from glass, ceramic, aluminum oxide, polymers, nutshells, organic substances, $CO_2$ pellets, snow, sand or minerals. The type, shape and size of the particles will be selected according to the cross-section of the through-line and the desired surface quality.

Moreover, the inner surfaces of the through-lines may be provided with a coating which has a sufficiently low surface roughness.

The surface-smoothing post-machining of the painting plant component after carrying out the rapid prototyping method may provide a roughness Rz which is lower than Rz=20, Rz=10, Rz=5 or even Rz=2 at least in sub-regions of the component surface. This low surface roughness is particularly desirable in through-lines for paint or rinsing agent in order to minimize adhesions of paint.

Furthermore, the exemplary painting plant components may have plastic parts and metal parts, both of which may be formed in the context of the rapid prototyping method. By way of example, a valve seat made from metal can in this way be seamlessly embedded in a polymer matrix. The plastic parts of the painting plant component then may have after the surface-smoothing post-machining a roughness Rz which is lower than Rz=20, Rz=15, Rz=10, Rz=9, Rz=8 or Rz=7 at least in sub-regions of the component surface, whereas the metal parts of the painting plant component may have after the surface-smoothing post-machining a roughness Rz which is lower than Rz=10, Rz=5, Rz=2 or Rz=1.5 at least in sub-regions of the component surface.

It should also be mentioned that the painting plant component in the context of the rapid prototyping method may be produced from different materials which differ in terms of their material properties and are adapted to the respective function of the component. By way of example, use may be made of a first material which is solvent-resistant and/or paint-resistant, while a second material has a greater hardness, fracture resistance, strength and/or stiffness than the first material. Through-lines for paint and/or rinsing agent can then be lined with the solvent-resistant and/or paint-resistant first material, while the painting plant component is otherwise made from the harder second material in order to achieve a greater strength of the component. Furthermore, the different materials may have different electrical properties, such as for example different specific electrical conductivities.

Exemplary production methods may be suitable for producing a wide range of different painting plant components, such as for example color valves for a painting plant or components of an atomizer, in particular a rotary atomizer, of a robot or of a sealing device which is used for sealing components. In addition, components of color changers or metering pumps may also be produced by the exemplary production methods. Furthermore, the exemplary production methods may also be suitable for producing scaled-down models of painting plant components, for example models of robots, in particular painting robots or handling robots, painting booths, painting lines, painting plants or atomizers, to mention only a few examples.

Advantageously, the exemplary painting plant components are substantially free of dead space and/or substantially free of undercuts, in order to achieve good rinsability. Of course, however, complicated geometries such as undercuts can also easily be produced.

Furthermore, the exemplary painting plant components may comprise a shell made from a high-strength polymer and a media-conveying through-line made from a solvent-resistant and/or paint-resistant polymer, the through-line serving in particular for the passage of paint or solvent.

The selective application of the different materials may also be derived from the methods used on multicolor photocopiers. In this case, light-sensitive intermediate carriers which have previously been exposed with an image of the layers to be produced are brought into contact with plastic powders ("toners"), the plastic powders being deposited only at the exposed locations. One light-sensitive intermediate carrier (e.g. drum, strip, plate) is provided for each material to be processed. The resulting latent images of the layers previously obtained from CAD data are transferred onto the object (i.e. onto the resulting shaped part) and are crosslinked or sintered there. The intermediate carrier may be heated in order to simplify transfer (particles adhere to the object). Optionally, the intermediate carrier is provided with an anti-adhesion layer. Optionally, the intermediate carrier is made from a material that is transparent to the radiation used for solidification (see in this regard also DE 43 32 982, claims 12ff.). In a further variant, it is provided that a support material has abrasive properties which are used to post-machine the inner surfaces during the washing-out process.

Another example of an exemplary painting plant component is a valve, in particular a color valve, comprising a valve seat made from metal which is embedded in a polymer. The polymer may be solvent-resistant and/or paint-resistant.

However, the exemplary painting plant components may be made from metal and may have at least one cavity which can be filled with a support structure, wherein at least one painting plant component region next to the support structure is filled at least partially with a material, in particular a polymer, which has a lower mass density than metal, in order to maintain a low weight of the painting plant component as a whole.

Another possibility lies in producing a honeycomb structure made from the same or a different material for weight reduction purposes.

It has already been mentioned above that different materials having different material properties can be used in the context of the exemplary rapid prototyping methods described herein. By way of example, a first material can first be applied by a rapid prototyping method. In the context of the rapid prototyping method, the first material can then be solidified at predefined locations in order to form the component, the applied first material being only partially solidified. The non-solidified portion of the first material is then removed, which may take place for example by suction. In a further step, a second material is then applied in the context of the rapid prototyping method and then is solidified at predefined locations in order to form the component, the applied second material also being only partially solidified, Finally, the non-solidified portion of the second material is then removed, for example by suction.

The different materials may in this case be applied by a print head which has a dedicated nozzle for each material.

It has already been mentioned above that the exemplary painting plant components may have through-lines for fluids, such as for example for paint, solvent or compressed air. The through-line may in this case be formed in such a way that the through-line is substantially free of kinks and/or is continuously curved at least over a portion of its length, wherein the radius of curvature may change continuously. Such a shaping of the through-line has a positive effect on the rinsability since then no turbulence or only a little turbulence which may lead to the deposition of paint can occur at the kinks in the through-line. The through-line may therefore be formed in such a way that the fluid (e.g. paint) in the through-line flows in a substantially laminar (vortex-free) manner, this applying in particular to regions of the through-line in which the direction of the through-line changes.

Furthermore, the bores may be guided in such a way that a maximum number of functions can be accommodated in the component/atomizer. This allows more functions for the same size, or else the component becomes smaller for an equal number of functions.

Moreover, a connection thread for the hoses may be arranged in the center of the component due to the twisting and movement through the hand axis. The channel is then guided in the vicinity of the outer wall of the component, in order to create space in the interior for functional components (e.g. for valves).

Another possibility is to integrate the mixer function by the targeted incorporation of turbulence-generating regions.

In addition, the inner wall of the through-line may be subjected to the above-mentioned surface-smoothing post-machining in order to achieve the lowest possible surface roughness on the inner wall of the through-line.

It should also be mentioned that a wide range of different materials may be used in the exemplary rapid prototyping methods, such as for example polymers with or without fiber filling, powder-based polymers, electrically conductive polymers, polyether ether ketone (PEEK), polyoxymethylene (POM), polyethylene terephthalate (PET), thermoplastic polyurethane (PUR), polyarylene ether sulfones, polysulfones (PSU), polyethersulfones (PESU), polyphenylsulfone (PPSU), polyphenylene sulfide (PPS), polyetherimide (PIS), polyester (PES), pulverulent materials, liquid materials, suspensions, duromers, in particular liquid duromers, thermoplasts, in particular polycarbonates, polyamides, polyvinyl chloride, acrylonitrile butadiene styrene (ABS), metal powder or UV-sensitive photopolymers.

It should also be mentioned that the exemplary illustrations does not only encompass the above-described exemplary production methods in which a rapid prototyping method is used.

Rather, the exemplary illustrations also encompass a correspondingly produced painting plant component which is characterized by being produced by means of a rapid prototyping method, this being detectable on the finished painting plant component.

One advantage of the exemplary illustrations lies in the reduced development time since the designer already has the desired painting plant component in his hand within a few hours after designing it, and is able to examine it. As a result, the overall development time is reduced, errors are more quickly detected and the installation space can be quickly examined. In addition, it is possible with the exemplary production methods to quickly produce a demonstration model, so that decisions concerning further development can be made more quickly since all the parties involved can envisage the component on the basis of the demonstration model. Furthermore, models for tools (e.g. castings) can also be quickly and easily produced using the exemplary production methods.

Moreover, the exemplary production methods may generally allow a greater product complexity which would not be possible in other manufacturing methods (e.g. material-removing manufacturing methods, casting technology, injection molding) or would not be profitable due to the low numbers of items. As a result, a number of technical functions can be integrated in the painting plant component and a greater packing density of the technical functional elements can be achieved.

Moreover, the weight of the painting plant components can be reduced by the exemplary production methods, as a result of which for example painting robots are subjected to a lower mechanical load. The reduction in mechanical load on the painting robots in turn allows greater movement dynamics, a lower current consumption and the construction of smaller robots. The reduction in the required robot size in turn allows smaller painting booths, which leads to lower investment costs and operating costs and thus reduces the painting costs per unit.

Furthermore, by virtue of the exemplary production methods, the manufacturing times from order to delivery can be reduced and the required stock level can be reduced or entirely abolished. In addition, the manufacturing depth can be increased since fewer manufacturing steps have to be outsourced.

Another advantage of the exemplary methods lies in the lower tooling costs, since fewer tools are required.

Moreover, tools and devices can also be produced using the production method according to the invention.

Another advantage of the exemplary methods lies in the reduction in production costs since the number of staff required for manufacture is lower. For example, no highly qualified CNC operators (CNC: Computerized Numerical Control) have to be employed for operating the machine tools, as is necessary in the prior art.

Moreover, in the context of the exemplary production methods, a portion of the programming work is omitted, which in turn results in a reduction in production costs.

One significant advantage of the production methods lies in the fact that small batches can be manufactured without high manufacturing costs (tooling costs), which in turn makes it possible to implement individual solutions for customers.

Since the exemplary production methods may be carried out in-house, it is not necessary in such cases to issue drawings and components to subcontractors, which would increase risk of industrial espionage.

Furthermore, with the exemplary production methods, the manufacturing know-how remains within the company and is not transferred to an external manufacturer.

Moreover, presentation models (e.g. including sections, half-sections) for training and marketing purposes can be produced inexpensively and quickly using the exemplary production methods.

The above-mentioned flow-optimized design of the through-lines for paint and rinsing agent advantageously reduces the paint consumption and the rinsing agent consumption during a color change. Furthermore, the color change time, the paint consumption and the rinsing agent consumption can also be reduced with the exemplary production methods.

The shorter reaction time during painting is also advantageous on a painting plant component configured according to the exemplary illustrations, since the through-lines for paint and/or rinsing agent can have optimal cross-sections, channel paths and line lengths.

A painting plant component produced according to the exemplary illustrations therefore may have an increased functionality and a lower weight while being of the same size, which is associated with the advantages mentioned above.

Furthermore, the exemplary painting plant components may also be more suitable for painting the interior of motor vehicle bodies since the painting plant components can be designed to be smaller while having the same functionality.

Moreover, in the context of the exemplary production methods, the wall thicknesses of the painting plant components can be optimized, which can in turn be used to improve the electrical insulation properties.

Finally, one advantage of the exemplary illustrations lies in the quicker procurement of replacement parts, since the replacement parts can be manufactured immediately when required.

The surface smoothing could in principle also be a compaction or other improvement of the surface. A protective layer or a so-called easy-to-clean surface (e.g. with a lotus effect or in the form of a shark skin) could also be applied, as a result of which not only the roughness is improved. A combination comprising for example lower roughness values for air lines and an easy-to-clean surface for paint lines is also possible. Furthermore, it is possible that a line initially has a smoothed surface and then has an easy-to-clean surface further along.

One variant could also be that the method is used mainly to produce "easy" components (e.g. cavities, lattice structures and optimal channel guidance), while conventional production methods continue to be used for high-precision functions, e.g. for specific fits: turning to measure, drilling, grinding, etc.

In one exemplary production method, which is shown in FIG. 1, a painting plant component is first designed in a CAD system in a conventional manner in a first step S1, design data for the painting plant component being produced in the CAD system. By way of example, the design data here may be in the known STL format (STL: Standard Triangulation Language), but other data formats are in principle also possible.

In a next step S2, the design data for the painting plant component are then converted into control data for a rapid prototyping machine. The rapid prototyping machine may be for example a machine of type EOSINT P390, P700 or P730 or FORMIGA P100, commercially available from EOS GmbH.

In a further step S3, the rapid prototyping machine is then actuated with the control data in order to produce the painting plant component.

A post-machining of the painting plant component for surface smoothing purposes then takes place in a step S4. Here, for example, particles (e.g. granules) can be passed through media through-lines in order to bring about a surface smoothing as a result of their abrasive effect on the inner wall of the media through-lines. A compaction is also possible here.

Finally, in a step S5, a so-called easy-to-clean surface may be produced on the inner wall of the media through-line in order to improve the rinsability. Steps S4 and S5 may take place jointly in any order or individually.

Figure 2:
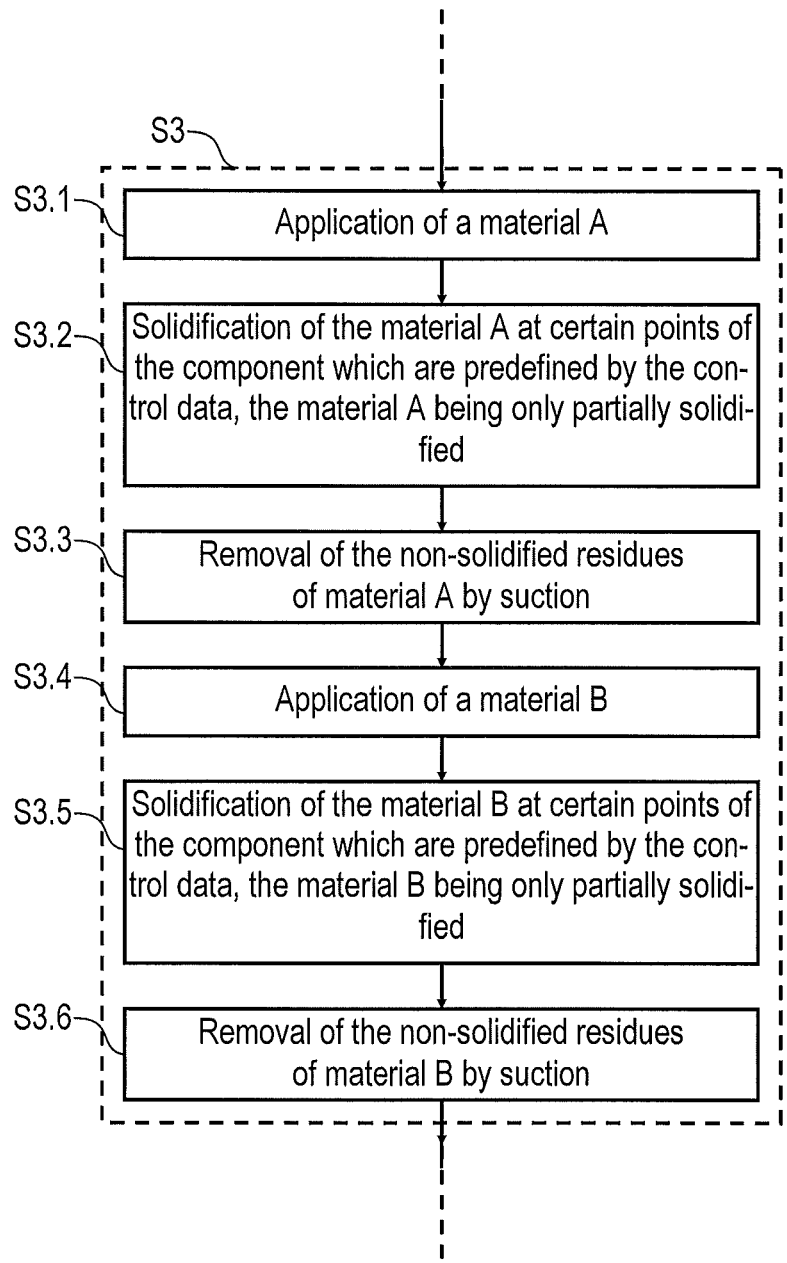
FIG. 2 shows the rapid prototyping method of FIG. 1 in a plurality of sub-steps in the form of a flowchart.

The flowchart in FIG. 2 shows step S3 of the rapid prototyping method in a plurality of sub-steps S3.1-S3.6.

In the first step S3.1, firstly a first layer of a first material A is applied. In the next step S3.2, the material A applied as a layer is then partially solidified at certain points of the component according to the predefined design and control data for the painting plant component. In the next step S3.3, the non-solidified residues of material A are then removed by suction. In the next step S3.4, a layer of a second material B is then applied and in step S3.5 is then partially solidified at certain points of the component according to the predefined control and design data. Finally, the non-solidified residues of material B are then removed by suction in step S3.6. Steps S3.1-S3.6 are then repeated for each material layer until the desired painting plant component is obtained.

In the context of the rapid prototyping method, therefore, the painting plant component is built up layer by layer from different materials in steps S3.1-S3.6, as a result of which almost any desired component geometries and material compositions can be achieved.

Figure 3:
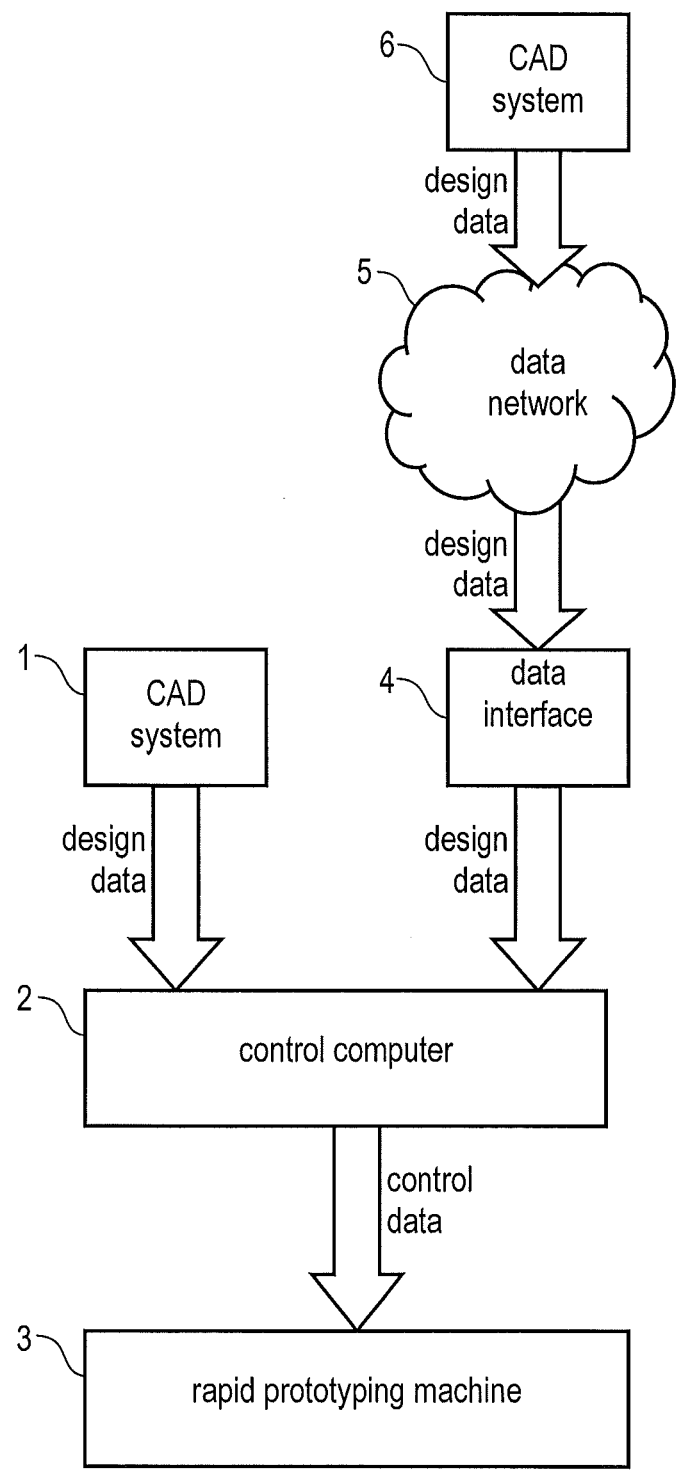
FIG. 3 shows an exemplary production device comprising a rapid prototyping machine.

FIG. 3 shows in greatly simplified form a corresponding production system for carrying out the production method shown in FIGS. 1 and 2.

Here, the painting plant component is designed in a conventional manner in a CAD system 1.

The CAD system 1 then transmits the design data (e.g. STL data) for the painting plant component to a control computer 2, which converts the design data for the painting plant component into control data for actuating a rapid prototyping machine 3. The rapid prototyping machine 3 then operates according to the control data predefined by the control computer 2 and thus creates the desired painting plant component using a rapid prototyping method.

As an alternative, it is also possible that the control computer 2 receives the design data for the painting plant component from a remote CAD system 6 via a data interface 4 and a data network 5. By way of example, numerous CAD systems 6 which each have access to the rapid prototyping machine 3 may be arranged in a design department.

Figure 4A:
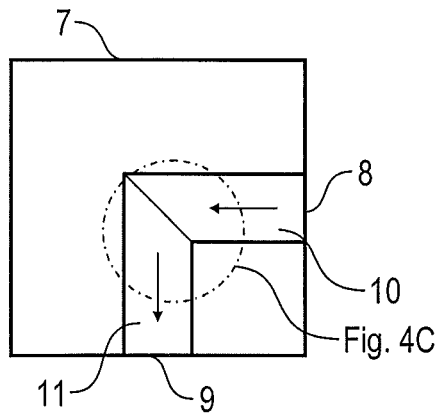
FIGS. 4A-4C show a painting plant component with a through-line for paint and rinsing agent, the through-line having a kink.
Figure 4B:
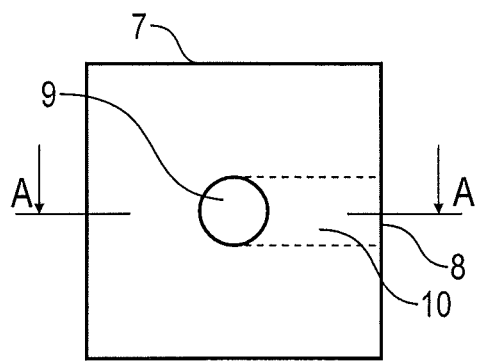
Figure 4C:
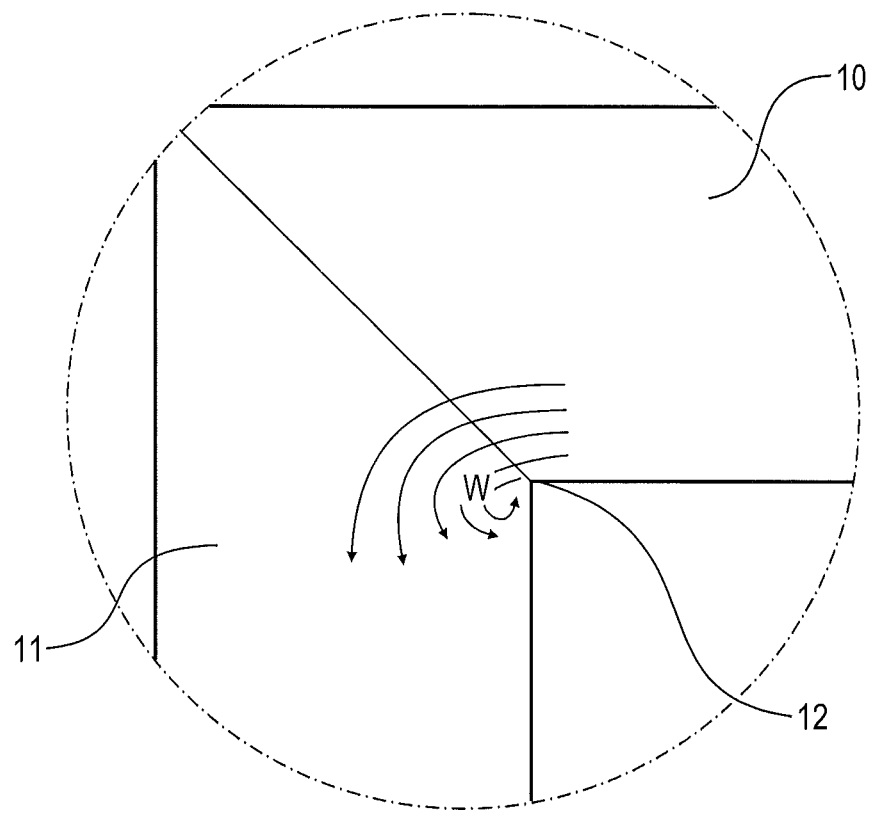

FIGS. 4A-4C show a fictitious painting plant component 7 according to the prior art. In this fictitious example of embodiment, the painting plant component 7 has an inlet 8, at which paint or rinsing agent enters the painting plant component 7. The paint or rinsing agent then leaves the painting plant component 7 via an outlet 9 which is oriented at right angles to the inlet 8. Running between the inlet 8 and the outlet 9 are two bores 10, 11 which are oriented at right angles to one another and merge into one another at a right-angled kink 12. This shaping makes it easy to produce the bores 10, 11 by means of a drill, but this demands a straight, kink-free and non-curved path of the individual bores 10, 11. As a result, turbulence W (cf. FIG. 4C) forms at the kink 12, which may lead to the depositing of paint and impairs the rinsability of the painting plant component 7.

Figure 5A:
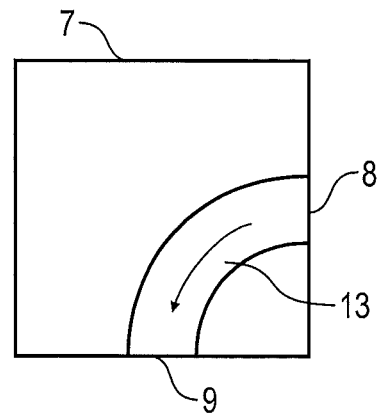
FIGS. 5A, 5B show an exemplary painting plant component which largely corresponds to the painting plant component shown in FIGS. 4A-4C but which has a kink-free, continuously curved through-line.
Figure 5B:
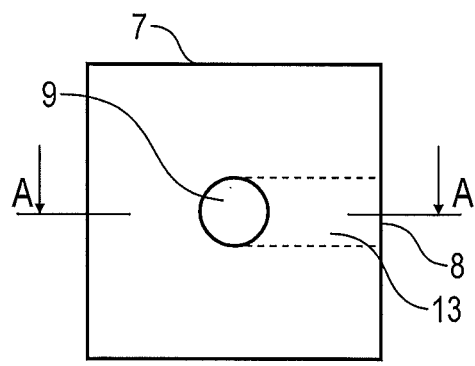
Figure 7A:
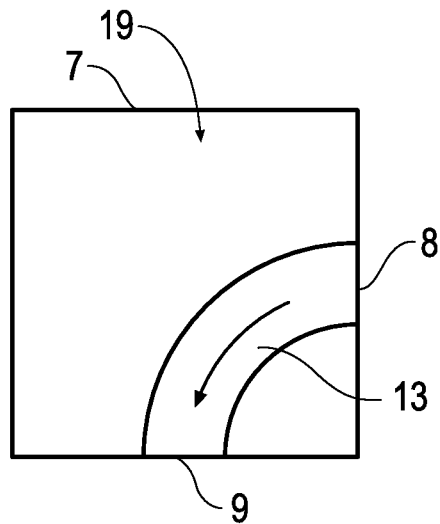
FIGS. 7A, 7B show an exemplary painting plant component which largely corresponds to the painting plant component shown in FIGS. 4A-4C but which has a kink-free, continuously curved through-line, and which includes a shell made from a high-strength polymer.
Figure 7B:
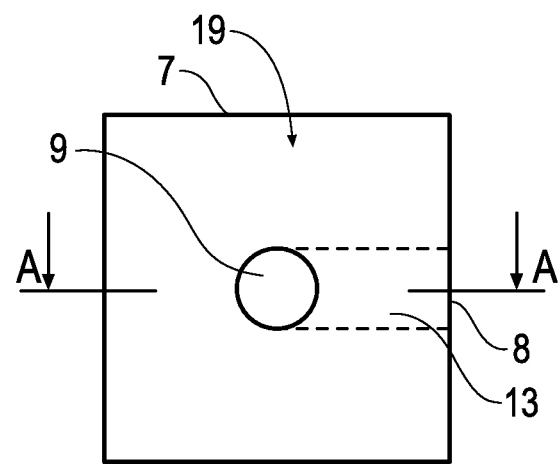
Figure 8A:
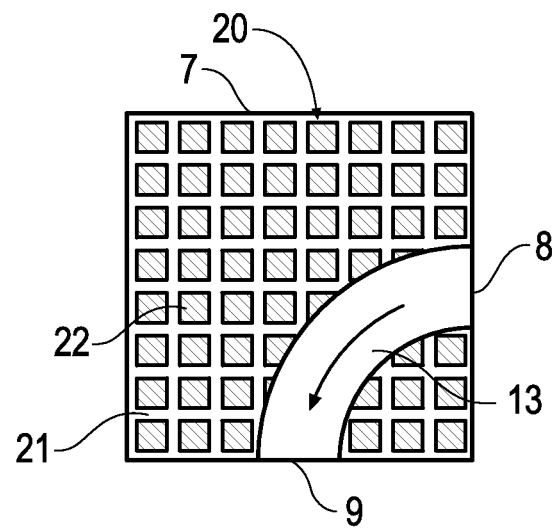
FIGS. 8A, 8B show an exemplary painting plant component which largely corresponds to the painting plant component shown in FIGS. 4A-4C but which has a kink-free, continuously curved through-line, and which comprises a metal and has at least one cavity filled with a support structure.
Figure 8B:
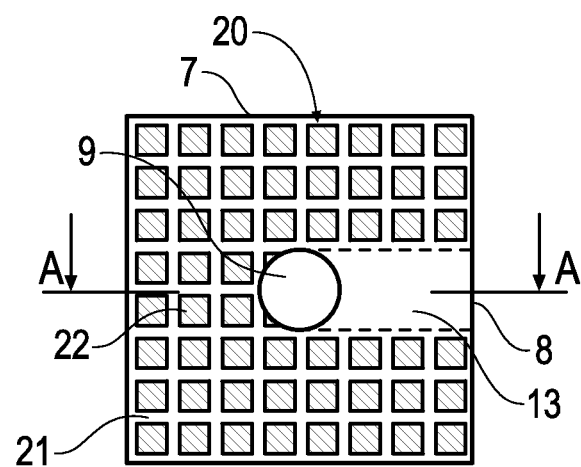

FIGS. 5A and 5B show a corresponding painting plant component 7 which has been produced and optimized in accordance with the exemplary illustrations and which largely corresponds to the example of embodiment described above and shown in FIGS. 4A-4C, so that reference is made to the above description in order to avoid repetitions, the same references being used for corresponding details. FIGS. 7A and 7B are largely in accord with FIGS. 5A and 5B but also show that the component 7 includes a shell 19 made from a high strength polymer. FIGS. 8A and 8B are also largely in accord with FIGS. 5A and 5B but also show that the component 7 includes a cavity 19 that includes a support structure 21 next to a lower-density material 22.

One particular feature of this example of embodiment lies in the fact that running between the inlet 8 and the outlet 9 is a continuously curved, kink-free through-line 13 in which paint and rinsing agent flow in a laminar (vortex-free) manner. On the one hand, the flow resistance between the inlet 8 and the outlet 9 is reduced as a result. On the other hand, the painting plant component 7 can be better rinsed due to the kink-free shape of the through-line 13.

Figure 6A:
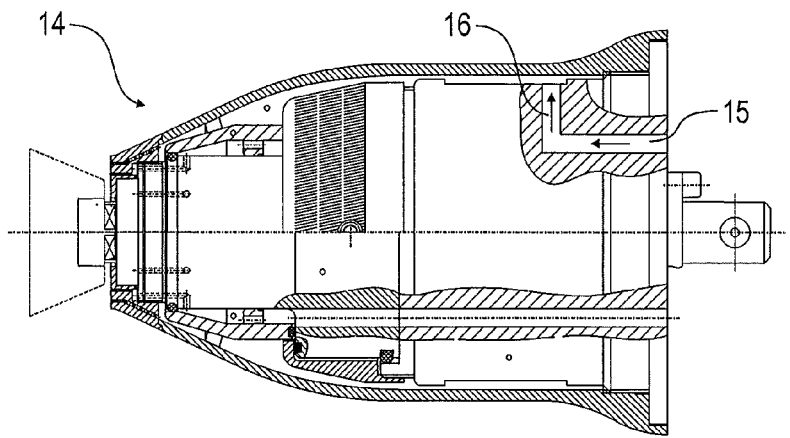
FIG. 6A shows a rotary atomizer comprising a shaping air line with a kink.

FIG. 6A shows a conventional rotary atomizer 14, as described for example in DE 102 33 198 A1, so that the content of said patent application regarding the structure and functioning of the rotary atomizer 14 must be included in its entirety in the present description.

The only important thing at this point is that the rotary atomizer 14 has a shaping air line which comprises an axially running stub bore 15 and a radially running stub bore 16, the stub bore 15 merging into the stub bore 16 at a right-angled kink.

One disadvantage of the kinked profile of the shaping air line at the transition between the stub bore 15 and the stub bore 16 is the relatively high flow resistance.

Figure 6B:
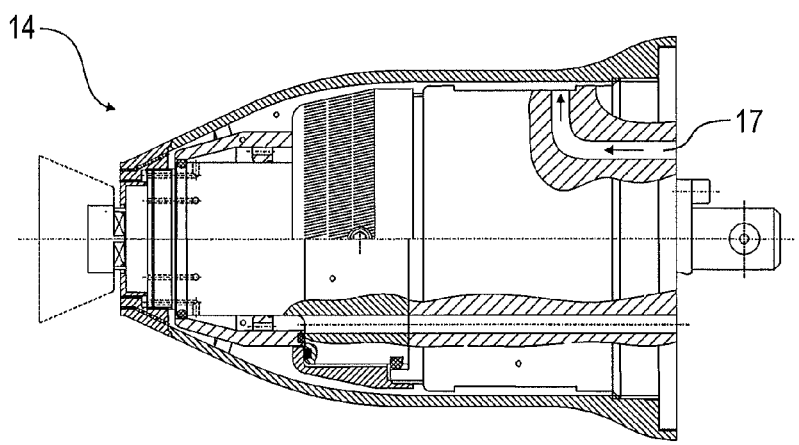
FIG. 6B shows an exemplary rotary atomizer which largely corresponds to the rotary atomizer shown in FIG. 6A but which comprises a kink-free shaping air line.

FIG. 6B shows an exemplary rotary atomizer 14 which, apart from the differences explained below, substantially corresponds to the rotary atomizer described above and shown in FIG. 6A, so that reference is made to the above description in order to avoid repetitions, the same references being used for corresponding details.

One particular feature of this example lies in the fact that the two stub bores 15, 16 running at right angles to one another in FIG. 6A are replaced by a continuously curved, kink-free shaping air line 17, which leads to a much lower flow resistance.

The exemplary illustrations are not limited to the examples specifically described above. Instead, a large number of variants and modifications are possible which likewise make use of the inventive concepts and therefore fall within the scope of protection.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A method, comprising:
   producing a component by rapid prototyping, wherein the component comprises a metal, a media-conveying through-line arranged to pass a fluid, and has at least one cavity filled with a support structure filled at least partially with a material having a lower mass density than metal; and
   smoothing the surface of the component with surface-smoothing post-machining.

2. The method according to claim 1, wherein the component is at least one of substantially free of dead space and substantially free of undercuts.

3. The method according to claim 1, comprising the following method steps in the context of the rapid prototyping:
   a) applying a first material,
   b) solidifying the first material at predefined locations in order to form the component, the applied first material being only partially solidified,
   c) removing the non-solidified portion of the first material,
   d) applying a second material,
   e) solidifying the second material at predefined locations in order to form the component, the applied second material being only partially solidified, and
   f) removing the non-solidified portion of the second material.

4. The method according to claim 3, wherein the different materials are applied by a print head that has at least one dedicated nozzle for each material.

5. The method according to claim 4, wherein the rapid prototyping includes one of the following:
   a) stereolithography,
   b) selective laser sintering,
   c) polyamide casting,
   d) laser generation,
   e) fused deposition modeling,
   f) laminated object modeling,
   g) 3D printing,
   h) contour drafting, and
   i) PolyJet.

6. The method according to claim 1, wherein the component is produced by a combination of the rapid prototyping and a material-removing process.

7. A method, comprising:
   producing a component by rapid prototyping, wherein the component comprises a shell made from a high-strength polymer, and a media-conveying through-line serving for passage of a fluid; and
   subjecting the through-line to a surface-smoothing post-machining, wherein the surface-smoothing post-machining is one of pickling, honing, lapping, treatment with $CO_2$ pellets or $CO_2$ snow, and passing particles through cavities or channels in the painting plant component, the particles being suspended in a carrier liquid or contained in a carrier gas, the particles being selected from a group consisting of granules, beads, spheres, shaped parts or dust made from glass ceramic, aluminum oxide, polymers, nutshells, organic substances, sand or minerals.

8. The method according to claim 7, wherein the rapid prototyping includes forming each of a plastic part and a metal part of the component.

9. The method according to claim 7, wherein the component is selected from a group consisting of:
   a) a color valve for a painting plant,
   b) a component of an atomizer,
   c) a component of a color changer,
   d) a component of a metering pump,
   e) a scaled-down model of a robot,
   f) a scaled-down model of a painting booth,
   g) a scaled-down model of a painting line,
   h) a scaled-down model of a painting plant,
   i) a scaled-down model of an atomizer,
   j) a media-conveying part of a robot,
   k) a robot component,
   l) a channel or a pipe,
   m) a component of a sealing device, and
   n) a manifold for all colors from the color changer to the energy chain.

10. The method according to claim 7, wherein the component is at least one of substantially free of dead space and substantially free of undercuts.

11. The method according to claim 7, comprising the following method steps in the context of the rapid prototyping:
    a) applying a first material,
    b) solidifying the first material at predefined locations in order to form the component, the applied first material being only partially solidified,
    c) removing the non-solidified portion of the first material,
    d) applying a second material,
    e) solidifying the second material at predefined locations in order to form the component, the applied second material being only partially solidified, and
    f) removing the non-solidified portion of the second material.

12. The method according to claim 7, wherein
    the through-line is formed in such a way that the through-line is substantially free of kinks,
    the through-line is formed in such a way that the through-line is continuously curved at least over a portion of its length, and
    the through-line is formed in such a way that the fluid in the through-line flows in a laminar manner.

13. The method according to claim 7, wherein at least one of the following materials are applied in the rapid prototyping:
    a) polymers without fiber filling,
    b) powder-based polymers,
    c) electrically conductive or non-conductive polymers,
    d) polyether ether ketone (PEEK), e) polyoxymethylene (POM),
f) polyethylene terephthalate (PET),
g) thermoplastic polyurethane (PUR),
h) polyarylene ether sulfones,
i) polysulfones (PSU),
j) polyethersulfones (PESU),
k) polyphenylsulfone (PPSU),
l) polyphenylene sulfide (PPS),
m) polyetherimide (PIS),
n) polyester (PES),
o) pulverulent materials,
p) liquid materials,
q) suspensions,
r) duromers,
s) thermoplasts,
t) polyvinyl chloride,
u) acrylonitrile butadiene styrene (ABS),
v) metal powder, and
w) UV-sensitive photopolymers.

14. The method according to claim 7, wherein the rapid prototyping includes one of the following:
a) stereolithography,
b) selective laser sintering,
c) polyamide casting,
d) laser generation,
e) fused deposition modeling,
f) laminated object modeling,
g) 3D printing,
h) contour drafting, and
i) PolyJet.

15. The method according to claim 7, wherein the component is produced by a combination of the rapid prototyping and a material-removing process.

16. The method according to claim 7, wherein the component is produced by the rapid prototyping at least from a first material and a second material.

17. The method according to claim 16, wherein the second material has at least one of a greater hardness, a greater fracture resistance, a greater strength and a greater stiffness than the first material.

18. The method according to claim 16, wherein the first material has different electrical properties than the second material.

19. The method according to claim 16, wherein different laser beams are respectively used for machining the different materials.

20. The method according to claim 16, wherein the different materials are applied by a print head that has at least one dedicated nozzle for each material.

* * * * *